No. 729,207.  
PATENTED MAY 26, 1903.  
F. MULLIGAN.  
MOUNTING FOR SPRING ADJUSTING RODS OF WEIGHING SCALES.  
APPLICATION FILED MAR. 19, 1902.  
NO MODEL.
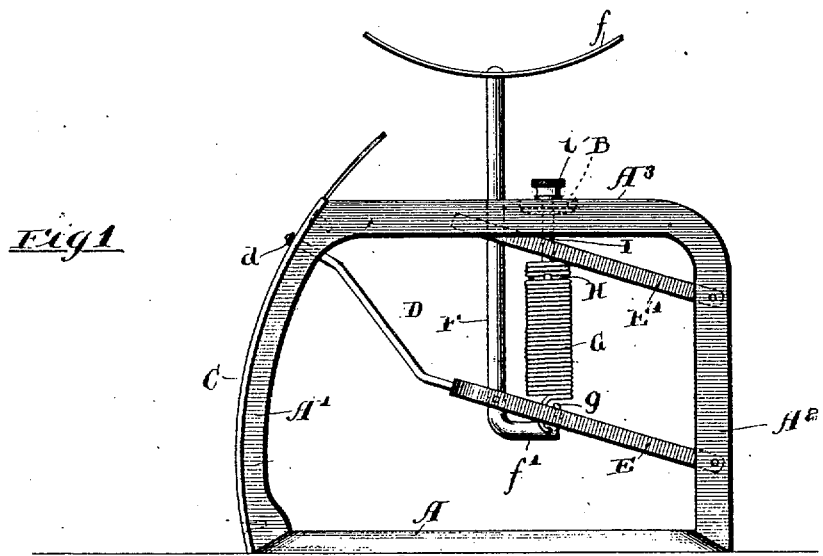
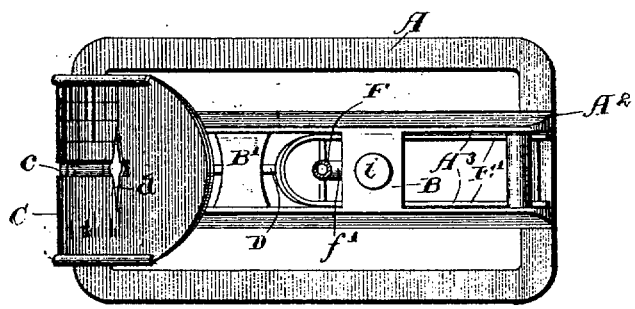
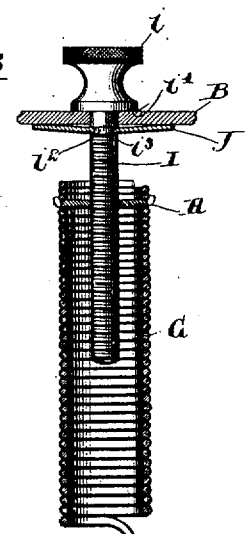
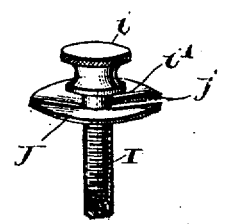
Witnesses:  
Carl H. Crawford  
William W. Hall
Inventor:  
Frank Mulligan  
by Pooler Brown  
his Attorneys No. 729,207. Patented May 26, 1903.

UNITED STATES PATENT OFFICE.

FRANK MULLIGAN, OF CHICAGO, ILLINOIS, ASSIGNOR TO PELOUZE SCALE AND MANUFACTURING COMPANY, OF CHICAGO, ILLINOIS, A CORPORATION OF ILLINOIS.

MOUNTING FOR SPRING ADJUSTING-RODS OF WEIGHING-SCALES.

SPECIFICATION forming part of Letters Patent No. 729,207, dated May 26, 1903.

Application filed March 19, 1902. Serial No. 98,885. (No model.)

*To all whom it may concern:*

Be it known that I, FRANK MULLIGAN, of Chicago, in the county of Cook and State of Illinois, have invented certain new and useful Improvements in Mountings for the Spring Adjusting-Rods of Weighing-Scales; and I do hereby declare that the following is a full, clear, and exact description thereof, reference being had to the accompanying drawings, and to the letters of reference marked thereon, which form a part of this specification.

This invention relates to that class of weighing-scales in which the downward movement of the scale-pan under the influence of the load is resisted by a coiled spring—such, for example, as the scale shown in the Gilfillan patent, No. 561,309, of June 2, 1896. In scales of this general class it has been found that the repeated use of the device, and particularly the sudden movement of the scale-pan, due to the dropping, accidentally or otherwise, of a load thereon, tends to loosen the connection of the tension-spring and to disturb the adjustment thereof.

The object, therefore, of this invention is to provide means for holding the adjusting-rod by which the spring is usually secured at one end in position with respect to the frame of the scale and by such means that sudden jars will not disturb the adjustment, while at the same time providing means whereby the rod will be yieldingly held in order that the adjustment of the tension-spring may be changed whenever desired.

To these ends the invention consists in the matters and things shown in the drawings and hereinafter described and claimed.

In the drawings, Figure 1 is a side elevation of a spring balance or scale with my improvements attached thereto. Fig. 2 is a plan view of the same. Fig. 3 is a central vertical sectional view of the spring and adjusting device. Fig. 4 is a perspective view of the spring-washer and the upper portion of the adjusting-rod.

Similar letters of reference indicate like parts throughout the several views.

The scale of the Gilfillan type herein illustrated and to which my improvement is shown as applied has a frame comprising a rectangular-shaped base A and upright front and rear members A' A², respectively, which upright members are connected together by horizontal or upper members A³ A³. The top members A³ A³ of the frame are strengthened usually by transverse bars or plates B B', a central vertical opening through the plate B being arranged to permit the passage of an adjusting-screw, as hereinafter specified.

C represents a graduated scale-plate conveniently secured upon the front of the upright front member A' and provided with a central vertically-arranged slot or opening $c$.

D is an index rod or bar provided on one end with a pointer $d$ and secured at its other end to the free end of an arm E. Said arm E is pivotally secured to the rear upright A² of the frame and at or near its forward end is pivotally attached to the scale-supporting standard or stem F.

$f$ represents the scale-pan. The upper end of the scale-pan stem F is held in proper position by being pivotally secured to the free end of a bar or arm E', arranged in parallel position with the arm E and which is similarly pivoted at its rear end to the rear upright A² of the frame. The lower end of the scale-pan stem F is provided with a lateral extension or arm $f'$, to which the lower end $g$ of the spring G is secured. The upper end of the spring is adjustably secured to the top or horizontal member of the frame A³ by means shown in the drawings, as follows: The flat plate or nut H, centrally apertured and interiorly screw-threaded, is secured between the convolutions of the spring G, near the upper end thereof, as shown in Fig. 3. This nut receives the lower end of an adjusting-rod I, which is passed through a suitable aperture in the cross-piece B of the frame, the upper part of the adjusting-rod being plain and not screw-threaded. The upper end of said adjusting-rod I is provided with a knurled head $i$, so arranged at its lower portion as to form a shoulder or flange $i'$, that rests directly upon the flat top of the plate B of the frame. At a suitable distance below the shoulder $i'$ is an annular groove $i^2$, adapted to receive a spring-washer J, which is concavo-convex in cross-section, as clearly shown in Figs. 3 and 4. The washer J is provided with a central aperture and also with a radial slot j, extending from the margin to said central aperture, the width of the slot being such as to permit of its being put over the stem or adjusting-rod I to engage said annular groove $i^2$.

In assembling the parts the adjusting-rod I is passed down through the aperture in the top member B of the frame and is engaged with the nut-plate H at the upper end of the spring G, which is then adjusted practically to its desired tension by turning said rod so as to bring the index-finger d to the proper position on the scale-plate C. The concavo-convex washer J is then pressed into position between the lower surface of the cross-plate B and the shoulder $i^3$, formed by the annular grooves $i^2$ of the adjusting-rod I. When in this position, the spring-washer naturally flattens out quite a bit, as is shown in Fig. 3, and holds the rod I firmly clamped to the frame top plate to resist any tendency of the rod I to turn, and thus change the adjustment. The tension of the spring-washer, however, is not such as to prevent adjustment or correction of the adjustment of the rod I and spring G, if necessary; but it is sufficient to prevent all accidental displacement due to the sudden dropping of a load upon the scale-pan. In other words, it completely obviates the objection heretofore existing in this class of devices. My washer is a new article and will be claimed as such.

While I have shown simply as a matter of convenience my improvements applied to a scale of the Gilfillan type, as stated, it will be manifest that it is equally adapted for use upon other styles and makes of scales.

What I claim, and desire to secure by Letters Patent, is as follows:

1. As a new article of manufacture, a thin, sheet, spring-metal washer, spherically concavo-convex and provided with a central aperture and with a slot extending radially from said aperture to the margin of said washer.

2. As a new article of manufacture, a thin sheet-metal spring-washer, having a curved or annular margin, all parts of which are located in the same plane, said washer being concavo-convex in cross-section and provided with a central aperture and with a slot extending radially from said aperture to the margin of the washer.

3. In a spring-balanced weighing-scale, the spring adjusting-rod, provided with a shoulder adapted to engage one side of the frame and with an annular groove near said shoulder combined with a concavo-convex spring-washer adapted for engagement with said groove and with the under surface of the scale-frame, substantially as and for the purpose set forth.

4. In a spring-balanced weighing-scale, the combination with the adjusting-rod provided with an inwardly-facing shoulder adapted to engage one side of the frame and with an opposing or outwardly-facing shoulder inside said frame, of a concavo-convex spring-washer surrounding said rod between said outwardly-facing shoulder and the frame and acting on said shoulders of the rod and the frame to hold the rod from displacement.

In testimony that I claim the foregoing as my invention I affix my signature, in presence of two witnesses, this 10th day of March, A. D. 1902.

FRANK MULLIGAN.

Witnesses:
LILLIAN KURTZ,
RAY E. GODDARD.